C. F. KETTERING.
CONTROL FOR ELECTRICAL SYSTEMS.
APPLICATION FILED AUG. 9, 1912.

1,231,265.

Patented June 26, 1917.
2 SHEETS—SHEET 1.

Witnesses
Walter W. Riedel
Joseph W. McDonald

Inventor
Charles F. Kettering
By Kerr, Page, Cooper & Hayward
Attorneys

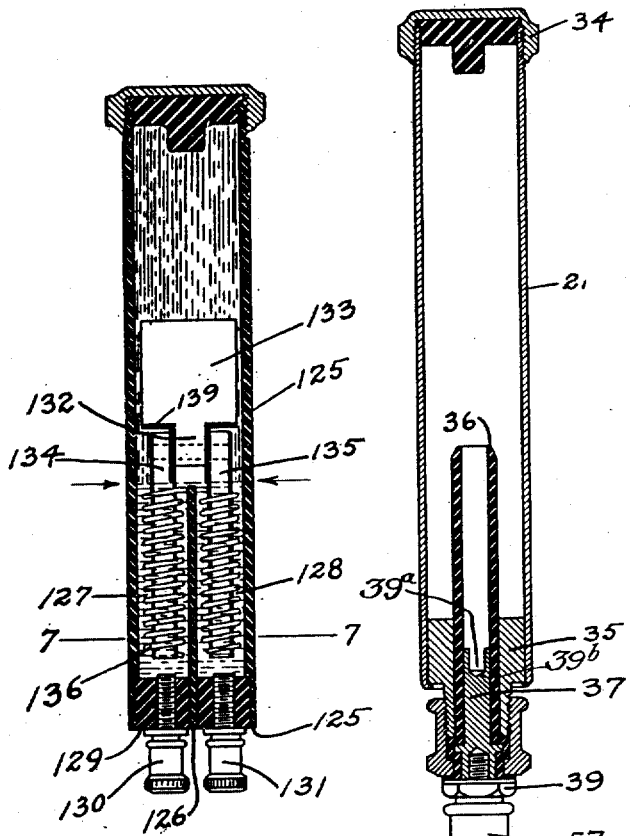
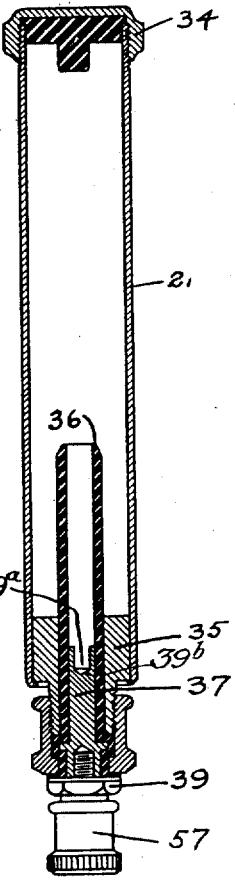
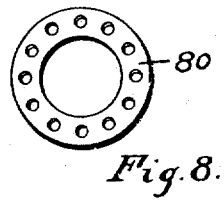
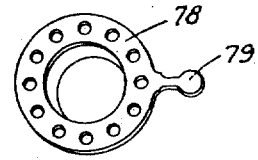
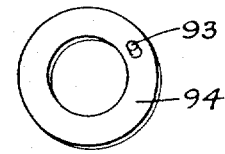
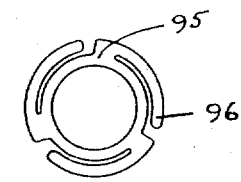

UNITED STATES PATENT OFFICE.

CHARLES F. KETTERING, OF DAYTON, OHIO, ASSIGNOR TO THE DAYTON ENGINEERING LABORATORIES CO., A CORPORATION OF OHIO.

CONTROL FOR ELECTRICAL SYSTEMS.

1,231,265.	Specification of Letters Patent.	Patented June 26, 1917.

Application filed August 9, 1912. Serial No. 714,234.

*To all whom it may concern:*

Be it known that I, CHARLES F. KETTERING, a citizen of the United States, residing at Dayton, county of Montgomery, and State of Ohio, have invented certain new and useful Improvements in Control for Electrical Systems, of which the following is a full, clear, and exact description.

This invention relates to an improvement in electric voltage regulators and more particularly to that type for controlling the voltage of an electric source or circuit, by increasing or decreasing the resistance therein.

It is among the objects of the present invention to provide a moving element which is automatically controlled by any predetermined condition which will cause resistance to be cut in or out of the circuit or circuits to be controlled; this moving element being so arranged that the frictional resistance encountered thereby, in its movements from one position to another, is reduced to a minimum.

Further objects and advantages of the present invention will be apparent from the following description, reference being had to the accompanying drawings, wherein a preferred form of embodiment of the present invention is clearly set forth.

In the drawings:

Fig. 5 is a detail vertical sectional view of the regulator tube or casing, with the plunger element removed therefrom.

Fig. 6 is a vertical sectional view of a modified form of the regulator casing and plunger element contained therein.

Fig. 7 is a sectional view taken on the line 7—7 of Fig. 6.

Figs. 8, 9, 10 and 11 are detail views of the controlling means for the rheostat.

Figure 1:
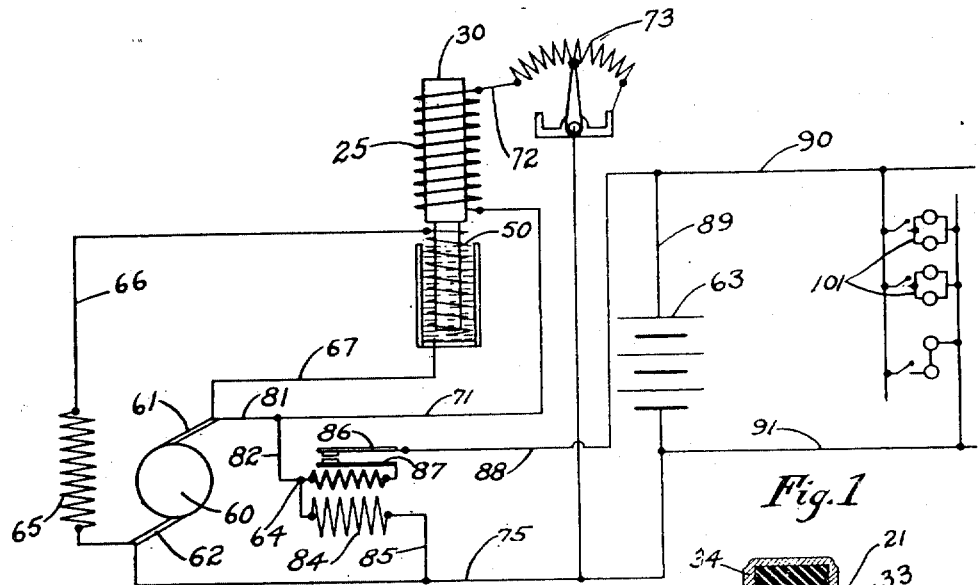
Figure 1 is a diagrammatic view showing one type of electrical system to which the present invention is especially adapted.
Figures 2, 3, 4:
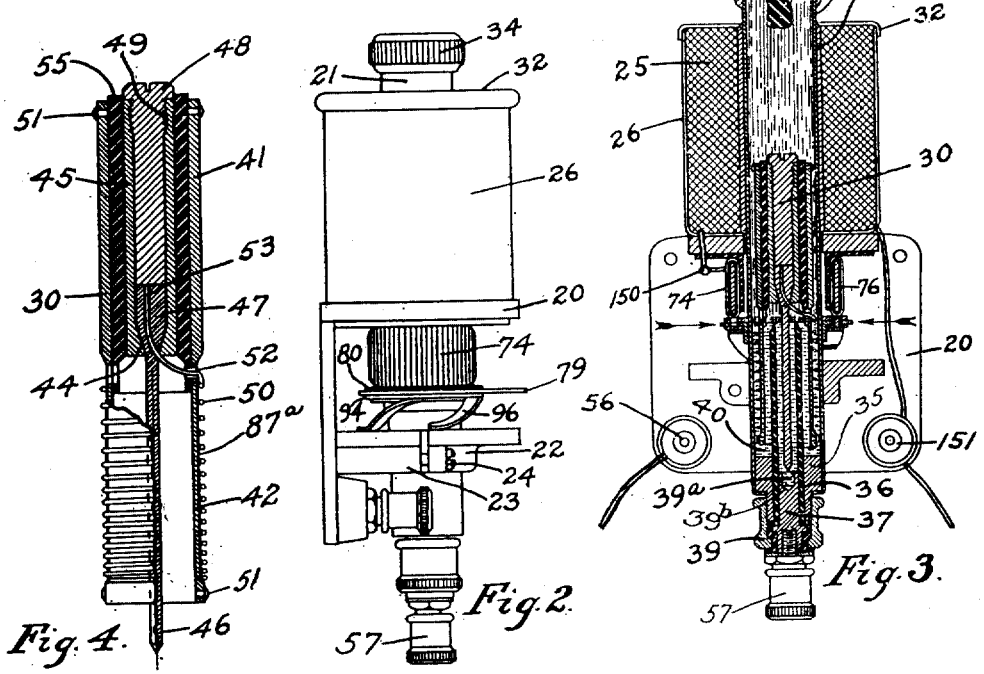
Fig. 2 is a view in side elevation of a regulator embodying the present invention.
Fig. 3 is a vertical sectional view of the regulator casing and the elements contained therein.
Fig. 4 is a detail sectional view of the movable element.

Referring to Figs. 1 and 2, it will be seen that the invention embodies broadly, a plunger element contained within a suitable casing, controlled in its movement by a coil, mounted outside of the tube containing the plunger element. This controlling coil, which will hereinafter be referred to as a voltage coil, is included in the controlling electrical circuit, while the plunger element is operable by the magnetic effect of the voltage coil to cut in or out resistance, relative to the circuit to be controlled.

The relation of the voltage coil to the plunger element is important, inasmuch as the movement of the plunger, in response to the attractive forces of the voltage coil, will be controlled initially by the distance to which the plunger normally extends into the voltage coil.

The numeral 20 indicates a bracket which supports the regulator tube or casing 21, by means of the clamping elements 22 and 23, which are adjusted into clamping position by means of the bolt 24.

This bracket element also acts as a support or mounting for the casing 26, which contains the voltage coil 25.

The casing which contains the voltage coil 25, is constructed of magnetic material and is provided with a cap or cover portion 32. This cover 32 and the bottom face of the holder 26, are provided with openings to permit the regulator casing 21, to be passed therethrough.

In order to positively support the coil 25 and the casing 21, a short tube 33, of suitable material, such as brass, extends from the bracket 20, up through the central opening in the coil 25. This tube 33 practically forms a bearing for the regulator casing.

It will be seen from the above that the regulator casing 21 and the voltage coil 25 and its covering 26, are independently mounted and supported by the bracket element 20, so that upon releasing the clamping effect of the arms 22 and 23, relative to the regulator casing 21, this casing may be raised or lowered, so that the plunger element 30, which is contained within the casing 21, may be normally so positioned relative to the voltage coil 25, that a predetermined voltage of current passing through the coil 25, will be effective to draw the plunger element 30, upward into the coil 25, much in the same manner as the action of a solenoid.

The regulator casing 21 is preferably of a tubular construction, and inasmuch as it is adapted to contain a body of mercury, or other conductive fluid or liquid, of substantially the same quality as mercury, it should be constructed of material which will not attack the properties of the mercury and which will in turn, itself, be proof against any attack of the mercury.

One end of the tube 21 is provided with a screw cap 34, which simply acts as a cover for the casing 21, while the other end of said casing or tube is provided with a hollow plug 35.

Through this plug 35, a short tubular piece of insulation extends, which projects centrally into the casing 21. This insulated tubular member will be referred to hereinafter, as the supplemental mercury well 36.

Within the inclosed end of the supplemental mercury well, a shouldered stud 37 is inserted, which forms electrical contact with the mercury contained within the supplemental mercury well 36, and the terminal element 39, secured to, but insulated from, the plug or closure 35.

The end of the stud 37, which extends into the mercury well 36, is grooved out as at 39$^a$, to form a pocket for the free end of the needle 46, wherein a suitable plug 39$^b$ may be inserted. This plug is preferably of copper or some other conductive material which will readily amalgamate with mercury, so as to insure an efficient electrical contact between the stud 37 and the body of mercury contained in the well 36.

Within the tube 21, the plunger element 30 is adapted to be buoyantly supported in the body of mercury or other suitable conducting liquid 40, as has been heretofore stated. The relation of the volume of mercury contained within the tube or casing 21, to the displacement of the plunger element 30, has been found to be extremely important.

In order that an instrument of this type may be rendered practical and also to simplify the construction thereof, so that the most efficient service will be secured, it is advisable that the displacement of the mercury, or conducting fluid, by the movement of the plunger, should be reduced as much as possible, so that the operation of the plunger, to cut in or out resistance, may be very delicately controlled.

In the present instance, the displacement of the conductive fluid or liquid, for given movements of the plunger, is reduced as much as possible, by constructing the plunger of a tubular shell 41, which in turn is reduced, as at 42, to receive the resistance wire or coil 50.

It will now be observed that it is advisable that the plunger element shall be of such weight; and the weight so distributed, that the tubular portion of the plunger, which carries the resistance winding, should be normally maintained in a submerged state in the mercury, or conductive liquid, so that the resistance winding or coil 50 will be completely covered by the mercury and will continue to be so covered, until the plunger element is actuated by the effect of the voltage coil to withdraw from the mercury.

It is also advisable that that portion of the plunger which lies within the voltage coil, should have as great a degree of permeability as possible, inasmuch as the effectiveness of the voltage coil, relative to the plunger element, should increase as the plunger is withdrawn from the mercury, in view of the fact that as the plunger is withdrawn, the buoyant effect of the mercury will decrease, which will tend to apparently increase the weight of the plunger, or at least will require greater attractive force from the voltage coil.

To accomplish the above objects, a metallic sleeve 45, having one end of the interior thereof constricted as at 44, is inserted within the open end of the plunger 30, but is separated therefrom, by means of the insulating sleeve 55, which is interposed between the plunger and the metallic sleeve 45. The lower end of the insulating sleeve 55 extends below the termination of the tube which forms the mercury well 36.

This sleeve 45 receives and carries the conductive pin or needle 46, which in turn has an enlarged head portion 47, beveled so as to snugly fit within the constricted end of the sleeve.

The needle 46 is maintained in proper position by means of the bolt 48, provided with the threaded portion 49, adjacent to its head, which engages with the correspondingly threaded portion of the interior of the sleeve 45.

This bolt 48 not only acts as a securing means for the pin 46, but also is so proportioned that the weight thereof increases the total weight of the plunger, so that it will normally sink into the mercury a predetermined distance. It will also be seen that by forming the bolt 48 of magnetic metal, the effectiveness of the voltage coil will be increased, inasmuch as substantially the entire portion of the plunger which is acted upon by the effect of the voltage coil, will be of magnetic material.

Now, as the plunger element is drawn up into the voltage coil, the magnetic circuit will be more nearly completed, whereby the decrease of the buoyant effect of the mercury on the plunger element, as it is withdrawn from the mercury, will be compensated for.

The resistance winding 50, which is carried by the plunger element 30, comprises a high resistance wire which is so applied to the plunger element that the space between the successive turns varies.

Thus, it will be seen that upon a given initial movement of the plunger, a certain number of turns of resistance wire will be withdrawn from the mercury and cut into the circuit to be controlled, while, for a further movement, equal to the initial given movement, a different number of turns of the resistance wire will be cut into or out of the circuit.

One of the characteristics of an electric machine is that as the speed increases and the machine reaches a fairly high speed, a greater amount of resistance must be cut in for the increased speed than when the machine is operating at a fairly low speed. The present invention meets this condition by varying the distance between the successive turns of the resistance unit on the plunger, so that at comparatively low speeds, a relatively low number of turns of resistance will be cut into the field of the generator for a given movement of the regulator plunger, while for an equal increment of movement of the plunger, after the machine has reached comparatively high speeds, are cut in a greater number of turns of the resistance, thus introducing a greater amount of resistance in the field circuit.

The upper end of this resistance winding passes through a small aperture 52, formed in the side of the plunger element and extends into an opening 53, embodied in the enlarged head of the pin 46, being clamped into position by means of the bolt or stud 48. The opposite end of the winding is secured to the plunger element in any suitable manner. The opening formed in the body of the plunger, through which the upper end of the resistance wire passes, is insulated so that the wire does not come in contact with the body of the plunger. In fact, the entire surface of the regulator which carries the resistance wire, is insulated therefrom, as at 87ª, in any suitable manner.

One of the main objections to machines or instruments of the present type and to practically all types of regulators, has been the frictional resistance encountered by the moving parts of the regulator, in their adjustment from one position to another.

In the present instance, the only points of the plunger element 30, which are ever in contact with any material, other than the mercury, are the guide points 51, which are formed of any suitable material and are secured adjacent to the opposite ends of the plunger element.

The body of mercury which is placed within the tube 21 and the supplemental well 36, normally forms a common conductor for the current which enters through the terminal connection 56 and leaves by the terminal connection 57. The terminal post 56 is secured to the bracket 20, and is in direct electrical connection with the bracket and thus in electrical connection with the regulator casing 21, which is, of course, conductively connected to the bracket 20.

The plunger element and the needle 46 should be in such proportion as to weight and size, relative to the body of mercury, that when the plunger element assumes its normal position, the displacement of the mercury by the submerged portion of the plunger 30, and the pin element 46, contained within the casing 21, and the supplemental well 36, respectively, will cause the mercury to overflow from the supplemental well into the body of mercury surrounding said well, thus forming a common conductive body.

The amount of overflow, however, should be carefully proportioned, inasmuch as it is advisable that the plunger element shall not be raised sufficiently to withdraw any of the turns of the resistance winding from the body of mercury, until the mercury, normally forming the main conductive body within the tube 21, is divided into two separate and independent bodies, contained respectively in the well 36 and the casing 21.

In the manufacturing and handling of regulators of the type embodied in the present invention, it often occurs that the regulators are displaced from their normal upright position. For instance, in the shipment of the regulators, they are often turned upside down in such a manner as to cause the conductive liquid to flow out of the supplemental well 36 and merge with the conductive liquid in the casing 21.

Now, when the regulators are placed in use, it is necessary that the predetermined proportions of mercury in the supplemental well and the outer casing 21 be maintained. This result is secured by so proportioning the conductive liquid that when the plunger is in normal position, the body of mercury in the outer casing 21, and the body of mercury in the supplemental well will be so displaced that they will merge into one common body of liquid, and will be maintained in this condition until the plunger is raised from its normal position.

From the above, it will be seen that even though the regulators are turned upside down, when they are again placed in their upright position, the mercury or conductive liquid will again assume its normal correct position.

It has been found that where a body of mercury is raised and lowered intermittently to different degrees, there is a tendency for the mercury to split up, so that small particles thereof will tend to adhere to the interior of the casing 21 and the plunger element 30. There is also a tendency of the mercury, when the regulator receives a sudden shock or jar, to splash, and it is, of course, advisable to provide some damping means to prevent this.

To avoid the above objections, a quantity of suitable oil is placed within the casing 21, which will have a damping effect on the body of mercury and at the same time will so lubricate the interior of the casing 21 and the plunger 30, that the mercury will be prevented from adhering to the sides of the casing and the plunger, and also from splashing.

It has been found that care must be exercised in the selection and preparation of the damping and lubricating oil, inasmuch as it must be of such properties that it will not attack either the tube 21, the plunger 30, or the body of mercury.

It will be understood that from the nature of the present invention, the circuit to be controlled, includes the plunger element and its associated parts, and also the body of mercury; while the circuit which is to control the movement of the plunger, so as to regulate the first named circuit, is connected to the terminals of the voltage coil.

Supposing that the regulator is adjusted so that when the voltage in the circuit connected with the voltage coil, increases beyond a certain predetermined point, as for instance, 6½ volts, then the voltage coil will be so energized as to withdraw the plunger 30 from the mercury, until such a time as sufficient resistance is cut into the circuit to be controlled, to meet the requirements.

Referring to the diagrammatic view, there is illustrated one form or system of electrical circuits and connections, wherein the present invention is especially adapted to be embodied.

In a system of this sort, the generator 60 is adapted to supply current to charge the accumulator 63, or to supply current direct to the load circuit, wherein are located suitable lamps or other translating devices 101.

Considering the generator to be at rest, it will be noted that the cut-out device 64, which embodies a pair of contacts, will be opened so that any supply of current which tends to flow back from the battery or accumulator 63, will be prevented from entering the generator 60, and thus operating the same as a motor.

Now, upon the starting of the generator 60, the voltage quickly builds up in the shunt field 65, while a certain amount of current will flow through the wires 81, 82, fine wire winding 84 of the cut-out device 64, wire 85, and wire 75 back to the generator 60. As soon as the voltage of the current has increased sufficiently, the contacts 86 and 87 of the cut-out device are closed and thus permit the current to flow through the line 88 to the accumulator, via the wire 89, or to the translating devices 101, through the wire 90, and thence back to the generator, via the wire 75 or the wire 91 and the wire 75, in case the generator is being used to supply the translating devices 101 with current direct.

The cut-out device 64 is employed not only to prevent the current in the accumulator 63 from flowing back into the generator 60, at such times as the generator is inoperative, but also at such times as the generator is operating, and the voltage of its out-put is less than the voltage of the accumulator.

The regulator heretofore described, is shown as having the resistance winding 50, included within the shunt field circuit, which embodies the brush 62, field winding 65, wire 66, wire 67 and the brush 61, respectively. The voltage coil, however, is shown as being connected directly across the armature of the generator and thus makes the following circuit; namely, from the brush 61, through the wire 71, voltage coil 25, wire 72, through the rheostat 73, which will be described hereinafter, wire 75 and the opposite brush 62.

It will now be seen that as the voltage of the out-put of the generator increases, it is necessary to provide some means which will prevent the increasing of the voltage to such a point that the accumulator 63 will be injured thereby, and also to prevent the voltage from increasing beyond the predetermined voltage, suitable for the load circuit, such as is shown at 101.

As soon as the voltage of the generator increases beyond the predetermined point, the voltage coil 25, will become energized to such an extent that it will attract the plunger 30 and tend to draw the same upwardly out of the body of mercury. As soon as the plunger element is withdrawn from the mercury, sufficiently to uncover a part of the resistance winding, the current through the field circuit will necessarily pass through that portion of the resistance wire 50 which has been withdrawn from the mercury, thus cutting in this portion of the resistance wire 50, thereby increasing the resistance within the field circuit. This will, of course, reduce the field excitation and consequently reduce the voltage of the generator out-put.

In Figs. 6 and 7, there is shown a modified form of the regulator casing and plunger elements heretofore described, which comprises a casing or tube 125, constructed of insulating material.

The lower portion of this tube is divided into separate compartments 127 and 128, by means of the plate 126, which is made fast or formed integral with the plug 129, which incloses the lower end of the regulator casing. Each of these compartments is designed to be filled with a quantity of conductive liquid, such as mercury and which normally forms a common conductive body, having electrical contact with the terminal posts 130 and 131.

The plunger element, in this case, is composed of a solid upper portion 133, connected to the two legs 134 and 135, which are separate and are adapted to fit within the compartments 127 and 128 respectively. A high resistance winding 136 is wound about each of the legs 134 and 135, so that a continuous winding results, which is normally completely submerged within the body of mercury contained within the casing 125.

It will, of course, be understood that the upper portion 133 of the plunger, is made of magnetic material and is adapted to be operated by the effect of the voltage coil 25, in exactly the same manner as that heretofore described in relation to the device shown in Fig. 3.

Each of the legs 134 and 135, respectively, is insulated from the body 133 of the plunger, by means of suitable strips of insulating material 139. It will now be seen that as the plunger element 132 is withdrawn from the mercury, the displacement therein, caused by the movement of the plunger, will cause the body of mercury to drop, so that two separate and independent bodies of conducting liquid will be formed within the casing 125, which will be contained respectively in the compartments 127 and 128.

Now it will be seen that as the plunger element 133 is withdrawn from the mercury, a certain number of turns of the resistance wire 136 will be withdrawn from the mercury, but as has been pointed out above, as soon as the plunger element 139 is withdrawn, the level of the body of mercury will drop to fill in the displacement of the plunger element. Therefore, the total number of turns of resistance wire which will be cut in will be the resultant of the number of turns which were withdrawn from the mercury by the movement of the plunger element, plus the number of turns which were uncovered by the drop in the level of the mercury. It will thus be seen that if the binding post 130 is connected to the wire 67 in the diagrammatic Fig. 1, and the wire 66 is connected to the terminal 131, the current passing through the shunt field must necessarily pass through the body of mercury contained in the compartment 127, thence through any of the turns of the resistance winding which may be withdrawn from the mercury and then through the body of mercury contained in the compartment 128.

Thus, it will be seen that the resistance in the shunt field will be regulated entirely by the movement of the plunger in substantially the same manner as is the case in the preferred form heretofore described.

Inasmuch as the regulators heretofore described, are required to indicate, measure or control very delicate changes in the voltage of a given circuit, and in accordance with said voltage, to control another circuit, some means must be provided for compensating for the effect of temperature upon the voltage winding.

In case a storage battery is combined with the present system, it is also desirable to compensate for the varying temperatures of the battery, in order to secure suitable results.

It is a well known fact that the internal resistance of a battery increases when the temperature lowers, while the resistance of the voltage coil decreases as the temperature lowers. The reverse of this action takes place, so that we find that as the temperature increases, the resistance of the voltage coil also increases, while the resistance of the battery decreases.

The present invention embodies means for compensating for this variation in the temperature and the consequential variation in the resistance of the voltage coil and the accumulator, which comprises a small rheostat 73, in series with the voltage coil 25.

The rheostat 73 comprises the winding 74, which is, as above stated, in series with the voltage coil 25, being connected as at 150, as shown clearly in Fig. 3.

The voltage winding 25 is also connected with its circuit by having a lead extending from the coil to the binding post 151, said binding post being insulated from the base or bracket 20.

The construction of the rheostat is important, inasmuch as it will be appreciated that variations in the resistances of the elements of the instrument may be compensated for by making the rheostat adjustable. That is, where the instrument, as a whole, is manufactured in large quantities, there will be varying conditions found as to resistance; in the construction of the voltage coil; and in the rheostat itself.

It is therefore advisable that each of the instruments should indicate and control as uniformly as possible, and this is made possible by a preliminary testing of the instruments and the varying of the resistance in the voltage coil, by the adjustment of the rheostat to secure substantially uniform conditions.

In order to accomplish the above objects, the rheostat is constructed of a conductive disk 94, carrying a pin 93, which lies adjacent to the perforated disk 78 and the insulating washer 80. The pin 93 is so located that it passes through one of the perforations in the disk 78 and the washer 80, so that the free end thereof will contact with some of the turns of the rheostat winding 74.

Inasmuch as the disks 94 and 78 are of conductive material, and are mounted directly on the regulator casing 21, it will be seen that a ground connection is made to the common terminal 56, inasmuch as the regulator casing 21 is conductively connected to the bracket 20. The washer 80 and the disks 78 and 94 are resiliently mounted in position by means of the spring washer 95, having depending fingers 96 which bear upon the upper face of the arms 22 and 23, so that the pin 93 is normally maintained in contact with some of the turns of the rheostat winding 74.

When the instrument is first assembled, a predetermined standard of operation is required and the disk 78 is moved around until just the required amount of resistance is cut into the voltage winding 25, to compensate for variations which may be present in the resistance of that particular instrument.

Now, as soon as this has been accomplished, the disks 78 and 94 are separated so that the disk 78 may be shifted around until the handle 79 thereof, assumes a central position, which will be indicated as zero. This disk 94 is then permitted to return to its normal position, whereby the contact pin 93 will engage the rheostat winding.

When extreme temperature changes are encountered, the handle 79 may be operated from its central or zero position, so as to move the disk 94 and the contact pin 93, over the turns of the rheostat winding, to cut in or out a certain amount of resistance, and thus compensate for the increase or decrease in the temperature.

While a preferred form of the present invention has been heretofore described and illustrated in the drawings, it should be understood that I do not intend to limit the invention thereto, but that I reserve the right to make whatever changes in the elements or in the combination of elements thereof, as may come within the scope of the invention, as is set forth in the appended claims.

What I claim is as follows:

1. In a regulator, the combination with a casing, containing a body of conductive liquid; of a well concentric to said regulator casing and containing a body of conductive liquid, insulated from the casing and the liquid contained therein; of a plunger element, a portion of which is tubular and is adapted to be submerged in the body of liquid within the casing; and a conductive element carried by the plunger but insulated therefrom and concentric to the tubular portion thereof, constantly in contact with the liquid contained in the supplemental well.

2. In a regulator, the combination with a casing containing a movable element; of a bracket member; a controlling coil mounted thereon; means connected to said bracket member for adjustably supporting the said casing and movable element, relative to the controlling coil; and a rheostat resiliently mounted on said means and connected to the controlling coil.

3. In a regulator, the combination with a casing containing a movable element; of a bracket member; a controlling coil mounted thereon; means connected to said bracket member for adjustably supporting said casing, relative to the controlling coil; a rheostat surrounding said casing and mounted intermediate the last named means and the controlling coil; and connections between said coil and rheostat.

4. In a regulator, the combination with a casing, and a controlling coil; a support for said casing and coil; a rheostat mounted thereon, and connected to the coil; and resiliently supported means for controlling said rheostat.

5. In a regulator, the combination with a casing; a supplemental well formed within said casing and insulated therefrom; a body of conductive liquid positioned in said supplemental well; and a plunger element having a hollow portion normally surrounding said well; and a contact needle secured to said plunger and normally positioned in said supplemental well.

6. In a regulator, the combination with a casing; a supplemental well and bodies of conductive liquid positioned in said casing and in said supplemental well; and a plunger element buoyantly supported in one of said conductive bodies and adapted to so displace said body when in normal position, that it will merge with the other body of conductive liquid, whereby in case the regulator is accidentally displaced and then returned to its normal position, the proportions of liquid in the outer casing of the supplemental well will be correctly maintained.

7. In a regulator, the combination with a movable plunger, a resistance winding wound on said plunger, the successive turns of said winding being spaced different distances apart; and means for bringing into effect a different number of turns of said winding for equal increments of movement of said plunger, whereby different amounts of resistance will be brought into effect for equal increments of movement of said plunger.

8. In a regulator, the combination with a casing containing a body of conductive liquid; a supplemental well insulated from said casing; a liquid contained within said casing and the supplemental well normally forming a common body of liquid; a resistance normally submerged in this common body of liquid; and a plunger element normally buoyantly supported by the common body of liquid and adapted upon movement to cause the common body of liquid to separate into two independent bodies, and also adapted to gradually withdraw the resistance from the conductive liquid.

9. In a regulator, the combination with a casing containing a body of conductive liquid; a supplemental well positioned in said casing and insulated from the casing and the body of conductive liquid; of a plunger element, one portion thereof being hollow and normally submerged within the body of liquid contained in the casing; a conductive element carried by the plunger but insulated therefrom, in electrical contact with the liquid contained in the supplemental well; a resistance winding carried by but insulated from the plunger element and normally submerged within the body of liquid contained in the casing, one end of said resistance winding being connected to the conductive element carried by the plunger, said plunger being adapted to be withdrawn from the bodies of liquid, whereby to withdraw the resistance winding from the conductive liquid.

10. In a regulator, the combination with a casing having a plurality of wells containing conductive liquid; of a plunger including conductive portions insulated from each other, extending into said wells, displacement of the liquid by the plunger causing the level of the liquid to rise so that a single body of liquid will be formed in said casing; a resistance normally covered by the liquid when constituting a single body of liquid; and a plunger element, said plunger element being adapted to be withdrawn from the body of conductive liquid, whereby the liquid level will be so lowered that separate and distinct bodies of liquid, insulated from each other, will be formed in the respective wells contained in the casing and a portion of said resistance will be withdrawn from the conductive liquid.

In testimony whereof I affix my signature in the presence of two subscribing witnesses.

CHARLES F. KETTERING.

Witnesses:
WALTER W. RIEDEL,
JOSEPH W. MCDONALD.

Copies of this patent may be obtained for five cents each, by addressing the "Commissioner of Patents, Washington, D. C."